(12) United States Patent
Torok

(10) Patent No.: US 9,849,418 B2
(45) Date of Patent: Dec. 26, 2017

(54) FILTER HOUSING HAVING VANES FOR FILTER OPTIMIZATION

(71) Applicant: DENSO International America, Inc., Southfield, MI (US)

(72) Inventor: Scott Torok, Allen Park, MI (US)

(73) Assignee: DENSO International America, Inc., Southfield, MI (US)

( * ) Notice: Subject to any disclaimer, the term of this patent is extended or adjusted under 35 U.S.C. 154(b) by 387 days.

(21) Appl. No.: 14/705,455

(22) Filed: May 6, 2015

(65) Prior Publication Data

US 2016/0325215 A1    Nov. 10, 2016

(51) Int. Cl.
*B01D 46/52* (2006.01)
*B01D 46/00* (2006.01)
*B01D 46/10* (2006.01)

(52) U.S. Cl.
CPC ....... *B01D 46/521* (2013.01); *B01D 46/0002* (2013.01); *B01D 46/0039* (2013.01); *B01D 46/0045* (2013.01); *B01D 46/10* (2013.01); *B01D 46/0047* (2013.01)

(58) Field of Classification Search
CPC ............ B01D 46/0002; B01D 46/0039; B01D 46/0045; B01D 46/0047; B01D 46/521; B01D 46/10
See application file for complete search history.

(56) References Cited

U.S. PATENT DOCUMENTS

| 4,083,362 | A | * | 4/1978 | Bergmark | F04D 25/12 126/299 D |
| 4,498,317 | A | * | 2/1985 | Thysen | D06F 25/00 68/12.15 |
| 4,658,707 | A | * | 4/1987 | Hawkins | B60H 1/00457 454/140 |
| 4,934,361 | A | * | 6/1990 | Michel | A62B 18/025 128/206.17 |
| 5,062,874 | A | * | 11/1991 | Legare | A62B 19/00 239/524 |
| 5,753,117 | A | * | 5/1998 | Jiang | B01D 29/15 210/232 |
| 6,328,791 | B1 | * | 12/2001 | Pillion | B01D 46/0043 55/471 |

(Continued)

FOREIGN PATENT DOCUMENTS

JP    H08215528 A    8/1996

*Primary Examiner* — Amber R Orlando
*Assistant Examiner* — Britanny Precht
(74) *Attorney, Agent, or Firm* — Harness, Dickey & Pierce, P.L.C.

(57) ABSTRACT

The present teachings provide for a housing for a panel filter, the housing including a main body, a plurality of first vanes, and a plurality of second vanes. The main body can define a chamber and a central aperture. The central aperture can extend through the main body and can be in fluid communication with the chamber. The plurality of first vanes can be disposed within the chamber and circumferentially spaced about the central aperture. Each first vane can extend radially outward from the central aperture a first distance. The plurality of second vanes can be disposed within the chamber and can be circumferentially spaced about the central aperture. Each second vane can extend radially outward from the central aperture a second distance that is less than the first distance.

7 Claims, 4 Drawing Sheets

(56) References Cited

U.S. PATENT DOCUMENTS

| | | | | |
|---|---|---|---|---|
| 6,497,232 B2* | 12/2002 | Fecteau | ............... | A62B 18/084 |
| | | | | 128/201.24 |
| 6,499,285 B1* | 12/2002 | Snyder | .................. | B64D 33/02 |
| | | | | 244/53 B |
| 6,837,268 B2* | 1/2005 | Skeens | ............... | B65D 33/1666 |
| | | | | 137/512.15 |
| 9,700,828 B2* | 7/2017 | Moredock | ............ | B01D 50/002 |
| 2003/0057148 A1* | 3/2003 | Zuk, Jr. | .................. | B01D 29/05 |
| | | | | 210/445 |
| 2005/0022549 A1* | 2/2005 | Anderson | ............. | F25D 17/042 |
| | | | | 62/317 |
| 2005/0145249 A1* | 7/2005 | Solyntjes | ............... | A62B 23/02 |
| | | | | 128/205.25 |
| 2006/0113796 A1* | 6/2006 | Fang | .................. | H02K 7/1807 |
| | | | | 290/1 R |
| 2006/0162303 A1* | 7/2006 | Gunderson | ........ | B01D 46/0045 |
| | | | | 55/417 |
| 2006/0185332 A1* | 8/2006 | Lindgren | ............... | A62C 3/04 |
| | | | | 55/315 |
| 2006/0288672 A1* | 12/2006 | Miyake | ............. | B01D 46/0005 |
| | | | | 55/385.3 |
| 2007/0066215 A1* | 3/2007 | Song | ................. | B01D 46/0004 |
| | | | | 454/329 |
| 2012/0318300 A1* | 12/2012 | Panzer | .................. | B26B 19/44 |
| | | | | 134/21 |

* cited by examiner

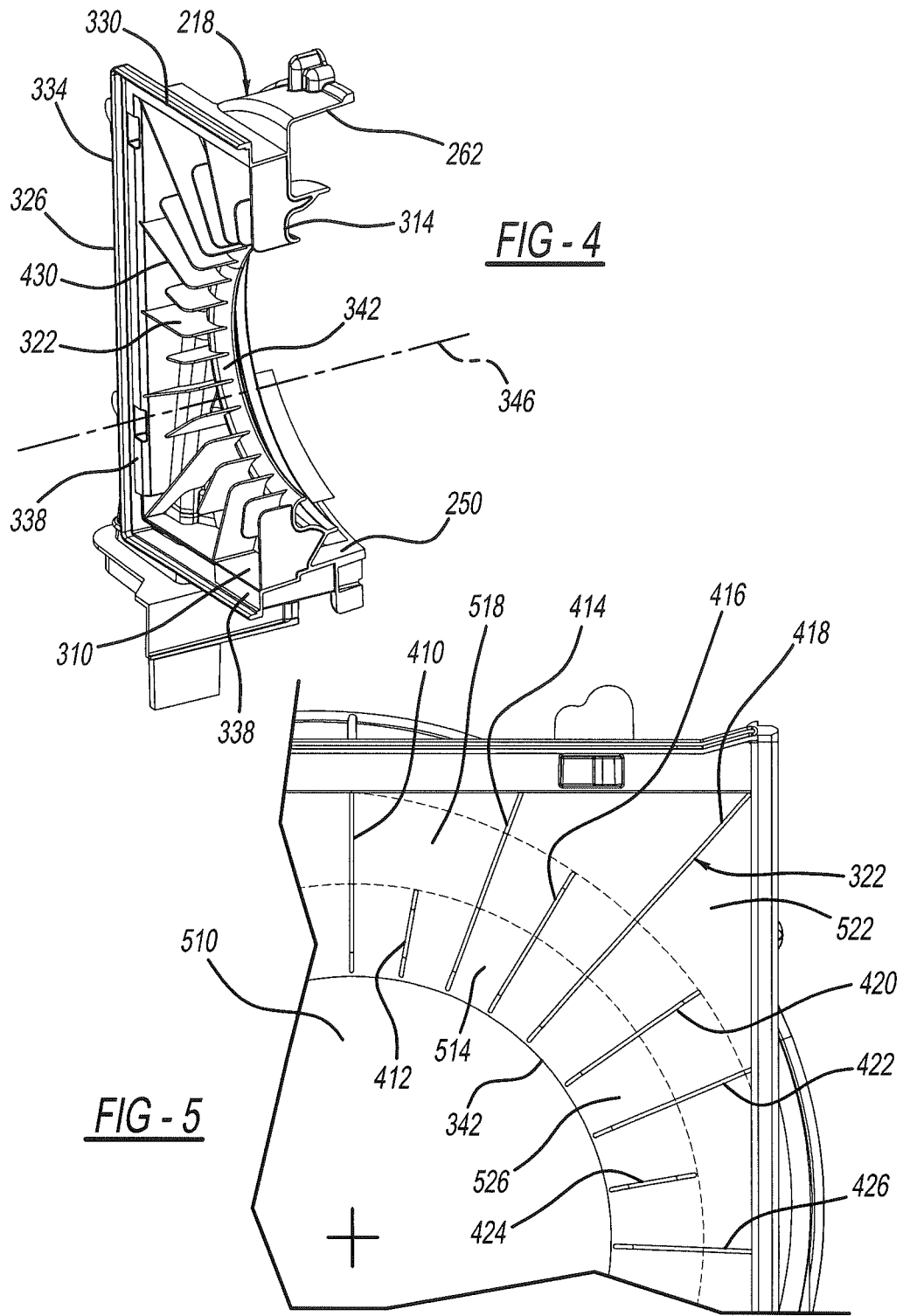

FILTER HOUSING HAVING VANES FOR FILTER OPTIMIZATION

FIELD

The present disclosure relates to a filter housing having vanes for filter optimization.

BACKGROUND

This section provides background information related to the present disclosure, which is not necessarily prior art.

Devices that use air for operations typically include an air filtration system to filter intake air before the intake air enters the device. For example, engines typically include an air filtration system to filter dust and debris out of intake air before the intake air reaches the combustion chamber of the engine. Similarly, heating, cooling, and air conditioning ("HVAC") systems typically include an air filtration system to filter dust and debris out of intake air before the intake air reaches other elements of the HVAC system (e.g. a blower, evaporator, or heater).

Air filtration systems typically include a housing and a filter disposed within the housing. The filter can be a panel type filter that includes a filter element, which is typically constructed of a corrugated or accordion-shaped, porous material (e.g. paper, fiber, foam), and typically has an overall rectangular or square shape. Filter housings that are designed for square or rectangular panel filters typically draw intake air through the filter element and through an aperture or conduit that is downstream of the filter element and has a smaller flow area than the panel filter. The panel filter is supported within the housing such that intake air must pass through the filter element before entering the aperture. The aperture is typically aligned with the center of the filter element and is configured to direct air to the other components of the air filtration system.

Under typical initial operating conditions, more intake air travels through the portion of the filter element aligned with the aperture (e.g. the center of the filter element). Over time, dust and debris can build up on the central portion of the filter element, while significantly less dust and debris builds up around perimeter areas of the filter element. This uneven distribution of dust and debris can lead to less efficient use of the panel filter and can result in replacement of the filter before the entire filter element is used.

SUMMARY

This section provides a general summary of the disclosure, and is not a comprehensive disclosure of its full scope or all of its features.

The present teachings provide for a housing for a panel filter, the housing including a main body, a plurality of first vanes, and a plurality of second vanes. The main body can define a chamber and a central aperture. The central aperture can extend through the main body and can be in fluid communication with the chamber. The plurality of first vanes can be disposed within the chamber and circumferentially spaced about the central aperture. Each first vane can extend radially outward from the central aperture a first distance. The plurality of second vanes can be disposed within the chamber and can be circumferentially spaced about the central aperture. Each second vane can extend radially outward from the central aperture a second distance that is less than the first distance.

The present teachings further provide for a housing for a panel filter, the housing including a main body, a plurality of first vanes, and a plurality of second vanes. The main body can include a plurality of side walls and a bottom wall. The side and bottom walls can define a chamber. The bottom wall can define a central aperture that extends through the main body and is in fluid communication with the chamber. The plurality of first vanes can be disposed within the chamber and can be circumferentially spaced about the central aperture. Each first vane can extend radially inward from the side walls to the central aperture. The plurality of second vanes can be disposed circumferentially between a pair of the first vanes. The second vanes can extend radially outward from the central aperture and can terminate radially inward of the side walls.

The present teachings further provide for an HVAC assembly including a housing, a filter, and a blower unit. The housing can define a first chamber, a second chamber, and a central aperture that can fluidly couple the first and second chambers. The housing can include a plurality of first vanes that can be disposed within the first chamber and circumferentially spaced about the central aperture. Each first vane can extend radially outward from the central aperture a first distance. The plurality of second vanes can be disposed within the first chamber and circumferentially spaced about the central aperture. Each second vane can extend radially outward from the central aperture a second distance that is less than the first distance. The filter can be disposed within the housing and upstream of the first chamber. The blower unit can include a fan and an electric motor. The fan can be disposed within the housing and downstream of the central aperture. The electric motor can be drivingly coupled to the fan. The blower unit can be configured to draw air through the filter and into the second chamber.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

FIG. 4 is a sectional view of the portion of the intake device of FIG. 2; and FIG. 5 is a plan view of a portion of the air intake device of FIG. 2.

Corresponding reference numerals indicate corresponding parts throughout the several views of the drawings.

DETAILED DESCRIPTION

Example embodiments will now be described more fully with reference to the accompanying drawings.

The present teachings are directed to an air intake device having a rectangular panel filter and a housing. The housing includes a plurality of vanes that support the filter above an aperture within the housing. The aperture has a flow area that is less than the flow area of the panel filter. The vanes promote more even flow across the entire area of the panel filter.

Figure 1:
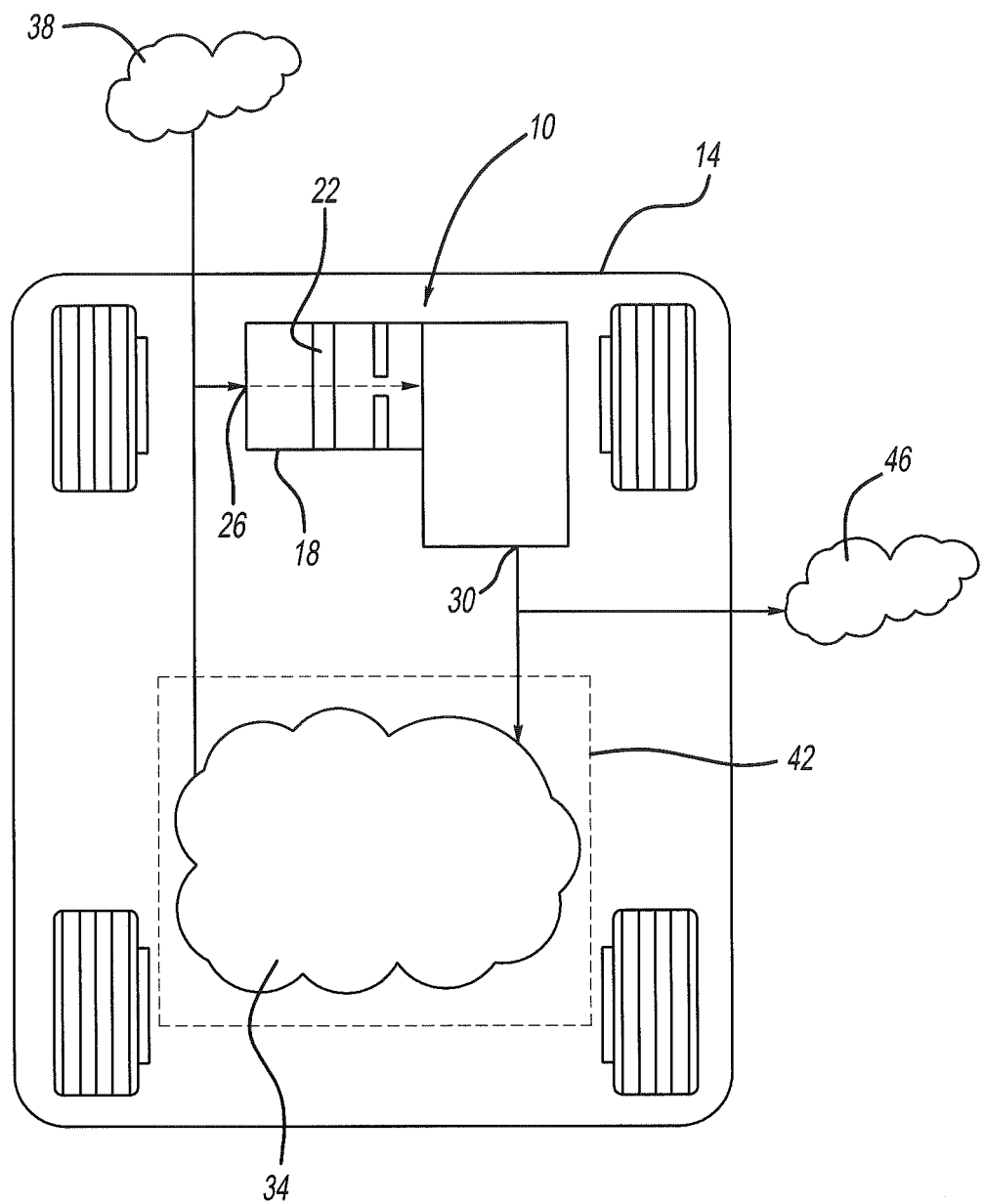
FIG. 1 is a representative vehicle including a plurality of air intake devices in accordance with the present teachings.
Figure 2:
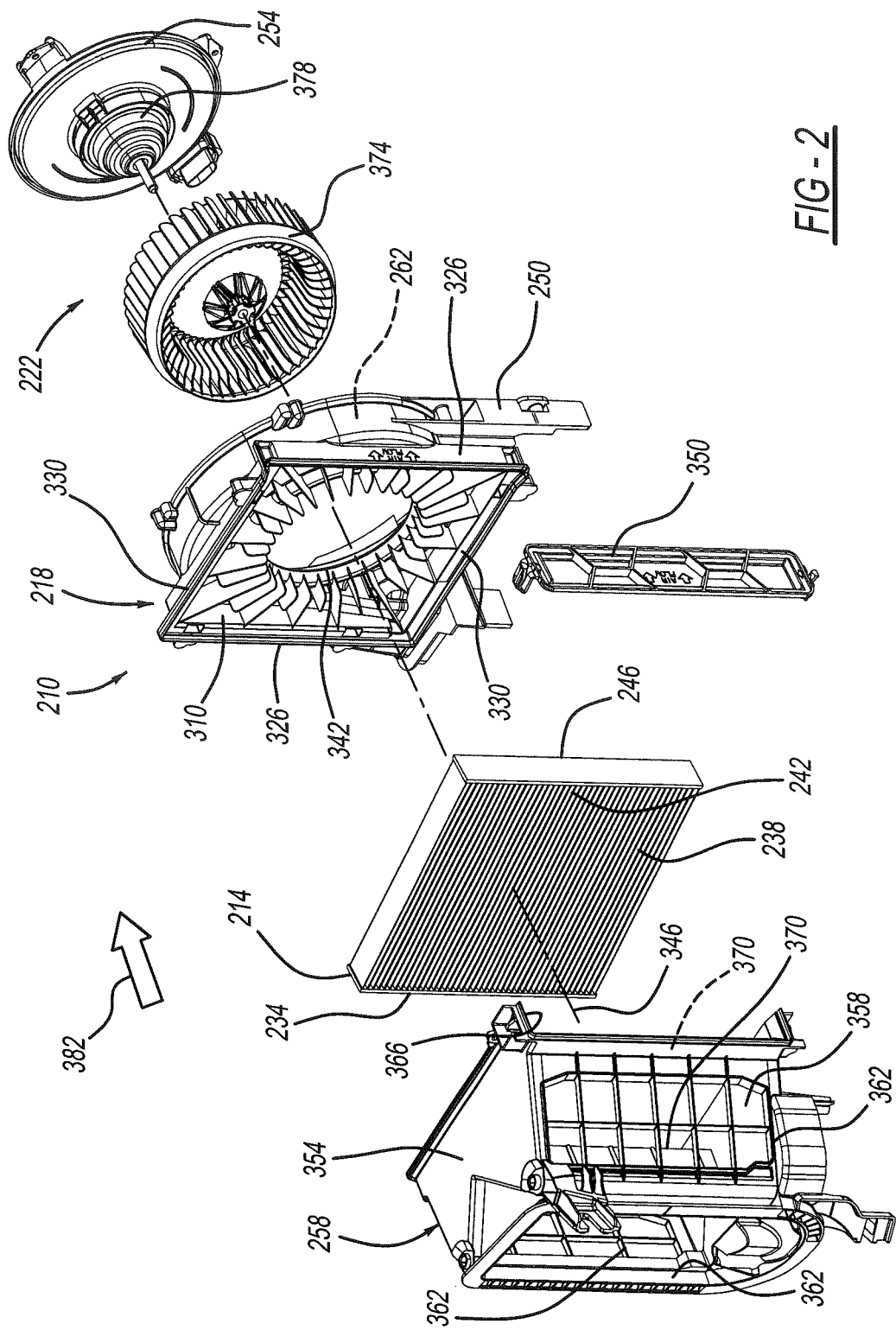
FIG. 2 is an exploded perspective view of a portion of one of the air intake devices of FIG. 1.
Figure 3:
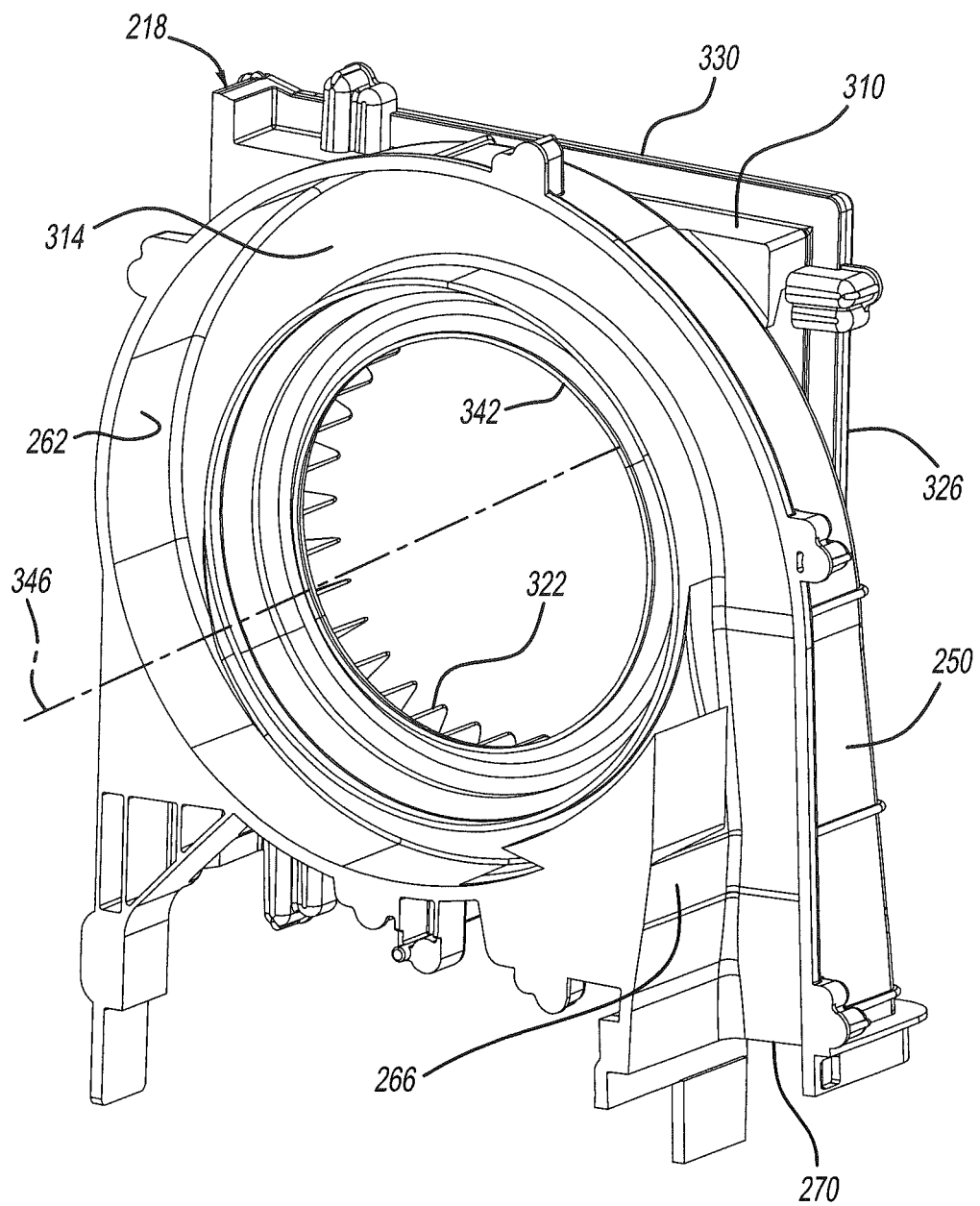
FIG. 3 is a perspective view of a portion of the air intake device of FIG. 2.

With specific reference to FIG. 1, an air intake device 10 of a representative vehicle 14 is illustrated. It is understood that the air intake device 10 can be used in other applications where intake air is drawn through a panel filter besides vehicles. The air intake device 10 can be any suitable type of air intake device and can include a housing 18, a panel filter 22, an inlet 26 and an outlet 30. For example, the air intake device 10 can be a heating, cooling, and air conditioning ("HVAC") system of the vehicle 14. In such an example, the air intake device 10 can draw intake air, through the inlet 26, from inside (e.g. air 34) and/or outside (e.g. air 38) of the vehicle 14. The air can flow through the panel filter 22 to trap debris (e.g. dust, dirt, allergens, particulate matter). The air intake device 10 can then heat, cool, and/or otherwise condition the filtered air. The air can then flow from the outlet 270 to a passenger compartment 42 of the vehicle 14.

In another example, the air intake device 10 can be a power plant (e.g. internal combustion engine) of the vehicle 14. In such an example, the air intake device 10 can draw intake air, through the inlet 26, from outside (e.g. air 38) the vehicle 14. The air can flow through the panel filter 22 to trap debris (e.g. dust, dirt, allergens, particulate matter). The intake device 10 can then use the filtered air to generate propulsive power (e.g. through internal combustion). In such an example, the outlet 270 (i.e. exhaust) does not expel the used air into the passenger compartment 42, but instead can expel the combustion products back outside (e.g. air 46) the vehicle 14.

With reference to FIGS. 2-5, an example of one type of the air intake device 10 of FIG. 1 is illustrated in greater detail and indicated by reference numeral 210. In the example provided, the air intake device 210 is an HVAC system and can operate as generally described above with reference to the air intake device 10 of FIG. 1. More specifically, the air intake device 210 can include a panel filter 214, a housing 218, and a blower unit 222.

The panel filter 214 can be any suitable shaped panel filter. In the example provided, the panel filter 214 has an outer perimeter 234 that is a generally rectangular shape, though the panel filter 214 can be square or another suitable shape (e.g. elliptical, polygonal). The panel filter 214 can include a filter element 238 formed of any suitable material (e.g. paper, fibers, foam) such that air can pass through the filter element 238 and the filter element 238 can trap debris to prevent debris from passing through the panel filter 214. In the example provided, the filter element 238 has a generally accordion shaped or corrugated construction, though other configurations can be used. The filter element 238 can have an upstream side 242 and a downstream side 246 and the distance between the upstream and downstream sides 242, 246 can be less than the distance between opposite sides of the outer perimeter 234. In other words, the thickness of the filter element 238 can be less than the length and height of the filter element 238 such that the filter element 238 generally has a panel shape.

The housing 218 can include a first shell 250, a second shell 254, and a cover 258. The first and second shells 250, 254 can mate together to define a blower chamber 262 and a flue 266. The flue 266 can fluidly couple the blower chamber 262 with an outlet 270 of the housing 218 which can be fluidly coupled to the passenger compartment of a vehicle (e.g. passenger compartment 42 of vehicle 14 shown in FIG. 1).

The outlet 270 can fluidly couple the flue 266 to a heater (not shown). The heater (not shown) can be configured such that the air flowing through the heater from the flue 266 can absorb heat from the heater (e.g. from a heating fluid or electric heating element in a conventional manner) to raise the temperature of the air before it is expelled to the passenger compartment (e.g. passenger compartment 42 of vehicle 14 shown in FIG. 1). The outlet 270 can also fluidly couple the flue 266 to an evaporator (not shown). The evaporator can be configured such that the air flowing through from the evaporator can expel heat to the evaporator e.g. to a cooling fluid in a conventional manner). A series of flues (not shown) and flue doors (not shown) can control the amount of air that flows from the outlet 270, to the evaporator and/or the heater before exiting to the passenger compartment (e.g. passenger compartment 42 of vehicle 14 shown in FIG. 1).

With specific reference to FIG. 4, the first shell 250 can include a perimeter wall 310 and a back wall 314 that define an air chamber 318. The first shell 250 can further include a plurality of vanes 322 disposed within the air chamber 318. The vanes 322 can be integrally formed with the first shell 250. The vanes 322 will be described in greater detail below. The perimeter wall 310 can define the perimeter of the air chamber 318 which can be generally rectangular having a longitudinal side 326 and a lateral side 330 that is shorter than the longitudinal side 326, though other configurations can be used (e.g. square, polygonal, circular, elliptical). The perimeter wall 310 can define an outer face 334 and can define one or more support lips 338 disposed about the perimeter of the air chamber 318 and recessed from the outer face 334. The shape of the outer perimeter 234 of the panel filter 214 can generally correspond to the shape of the perimeter wall 310 such that the panel filter 214 can be received within a portion of the perimeter wall 310, and such that the outer perimeter 234 of the panel filter 214 can be supported above the air chamber 318 by the support lips 338. The panel filter 214 can form a seal with the perimeter wall 310 and/or with the support lip 338.

The back wall 314 can generally separate the air chamber 318 from the blower chamber 262 and can define an aperture 342 that fluidly couples the air chamber 318 to the blower chamber 262. The aperture 342 can be smaller than (i.e. have a smaller area than) the air chamber 318. The aperture 342 can be a round aperture and can be located generally in the center of the back wall 314 and at the center of the air chamber 318 and blower chamber 262. In the example provided, the aperture 342 is centered about a flow axis 346 that extends through the center of the panel filter 214. It is appreciated that the aperture 342 can be other shapes besides round (e.g. square, rectangular, elliptical, polygonal) and can be located offset from the center of the back wall 314 or the center of the air or blower chambers 318, 262.

The cover 258 can include a cap 350 and a cover body 354 that defines a cover chamber 358 and one or more apertures 362 (which can be fluidly coupled to an inlet similar to inlet 26 of FIG. 1). The apertures 362 can fluidly couple the cover chamber 358 to the exterior of a vehicle (e.g. air 38 exterior of vehicle 14, shown in FIG. 1) and/or to the passenger compartment of the vehicle (e.g. air 34 within the passenger compartment 42, shown in FIG. 1). The cover body 354 can be configured to be mounted to the first shell 250 to oppose the outer face 334. The cover body 354 can be mounted to the first shell 250 with the panel filter 214 generally axially between the air chamber 318 and the cover chamber 358 such that the upstream side 242 of the filter element 238 faces the cover chamber 358 and the downstream side 246 faces the air chamber 318.

The cover body 354 can define a filter slot 366 that can be transverse to the flow axis 346 of the panel filter 214. The panel filter 214 can be received through the filter slot 366 to be positioned axially between the cover chamber 358 and the air chamber 318. In the example provided, the cover body 354 includes a set of shoulders 370 configured to prevent the panel filter 214 from moving axially away from the first shell 250. The cap 350 can be removably coupled to the cover body 354 and configured to close the filter slot 366 to prevent the panel filter 214 from being removed through the filter slot 366 when the cap 350 is attached to the cover body 354.

The blower unit 222 can be constructed in a conventional manner and can generally include a fan 374 and an electric motor 378. The fan 374 can be disposed within the blower chamber 262. The electric motor 378 can be drivingly coupled to the fan 374 to rotate the fan 374 within the blower chamber 262. The fan 374 can be configured to draw air through the cover chamber 358, filter element 238, air chamber 318, and aperture 342 and into the blower chamber 262 when rotated by the electric motor 378 (i.e. to flow in the direction indicated by arrow 382). The fan 374 can be configured to blow the air from the blower chamber 262 through the flues 266, and out the outlet 270 to the passenger compartment (e.g. passenger compartment 42 shown in FIG. 1).

With specific reference to FIG. 5, the plurality of vanes 322 can include a set of first vanes 410 and a set of second vanes 412. The plurality of vanes 322 can also include additional sets of vanes, such as sets of third through ninth vanes 414, 416, 418, 420, 422, 424, 426, though more or fewer sets of vanes can be used. The first through ninth sets of vanes 414, 416, 418, 420, 422, 424, 426 can be circumferentially spaced about the aperture 342 and each of the vanes 322 can extend radially outward from the aperture 342.

The vanes 322 can be configured such that the distance between adjacent ones of the vanes 322 increases with increased radial distance from the aperture 342. In the example provided, the vanes 322 are planar or straight and aligned with the center of the aperture 342 such that each vane 322 extends longitudinally along a line that intersects the flow axis 346. The vanes 322 can contact with and extend axially outward from the back wall 314 into the air chamber 318. The vanes 322 can terminate axially such that an edge 430 (FIG. 4) of each vane 322 can be generally level with the support lip 338 such that the vanes 322 can support the panel filter 214 axially relative to the air chamber 318 and spaced apart from the aperture 342.

The vanes 322 can be symmetrically disposed about the flow axis 346 (i.e. the center of aperture 342). The vanes 322 can be equally spaced apart in the circumferential direction. In the example provided, each quadrant of the air chamber 318 is symmetrical with respect to the relative locations of the first through ninth vanes 414, 416, 418, 420, 422, 424, 426. For example, the air chamber 318 can be divided into quadrants along the first vanes 410 and the ninth vanes 426. When viewed as shown in FIG. 5, the vanes 322 can be arranged in each quadrant in the following clockwise order (though other configurations can be used): one of the first vanes 410, one of the second vanes 412, one of the third vanes 414, one of the fourth vanes 416, one of the fifth vanes 418, one of the sixth vanes 420, one of the seventh vanes 422, one of the eighth vanes 424, and one of the ninth vanes 426.

Each of the first through ninth sets of vanes 414, 416, 418, 420, 422, 424, 426 can extend a respective radial length from the aperture 342 (i.e. the length of the vane 322 from the aperture to the radially outermost point of the vane 322). The respective radial lengths of the sets of vanes 414, 416, 418, 420, 422, 424, 426 can be different, though some of the sets of vanes 414, 416, 418, 420, 422, 424, 426 can have similar radial lengths.

In the example provided, the radial lengths of the second vanes 412 are similar to that of the eighth vanes 424, while the ninth vanes 426 have radial lengths greater than the second vanes 412. In the example provided, the sixth vanes 420 have greater radial lengths than the ninth vanes 426, the fourth vanes 416 have greater radial lengths than the sixth vanes 420, the seventh vanes 422 have greater radial lengths than the fourth vanes 416, the first vanes 410 have greater radial lengths than the seventh vanes 422, the third vanes 414 have greater radial lengths than the first vanes 410, and the fifth vanes 418 have greater radial lengths than the third vanes 414, though other configurations can be used.

In the example provided, the first vanes 410, third vanes 414, fifth vanes 418, seventh vanes 422, and ninth vanes 426 extend fully between the aperture 342 and the perimeter wall 310 to contact the perimeter wall 310, though other configurations can be used. In the example provided, the first vanes 410 and third vanes 414 contact the lateral sides 330, the seventh vanes 422 and ninth vanes 426 contact the longitudinal sides 326, and the fifth vanes 418 contact the corners of the perimeter wall 310 where the lateral sides 330 and the longitudinal sides 326 meet, though other configurations can be used.

When the blower unit 222 operates with a relatively clean filter element 238, a greater amount of air can be drawn through a center zone 510 of the air chamber 318 that corresponds to the location of the aperture 342 and a similar region (not specifically shown) on the filter element 238, since this is the airflow path of least resistance. Accordingly, debris can build up on the filter element 238 at this center zone 510. As debris builds up at the center zone 510, the debris can inhibit the flow of air through the center zone 510 and the pressure at the center zone 510 can increase.

In conventional filter systems (not shown) the buildup of debris in the center zone 510 would diminish the airflow through the center zone 510 and the general area where airflow would be most significant through the filter element 238 would expand to a first intermediate region that is immediately radially outward of the center zone 510. As the first intermediate region then becomes more blocked by debris, the general area where airflow would be most significant through the filter would expand to a second intermediate region that is immediately radially outward of the first intermediate region. In this way, the debris would slowly build up in concentrically expanding regions about the center zone 510. Typically, this pattern of buildup can lead to lower performance even while the areas of the filter element 238 that are nearest to the outer perimeter 234 remain relatively unused.

Returning to FIG. 5, the vanes 322 can be arranged to define a first intermediate zone 514, a second intermediate zone 518 and an outer zone 522. The first intermediate zone 514 can be an annular area disposed immediately concentrically about the center zone 510. The first intermediate zone 514 can have an outer diameter that corresponds with the radially outermost edge of one or more of the sets of vanes 414, 416, 418, 420, 422, 424, 426. In the example provided, the outer diameter of the first intermediate zone 514 generally corresponds to the radially outermost edges of the second vanes 412 and the eighth vanes 424. In the example provided, the outer diameter of the first intermediate zone 514 generally corresponds to halfway between the center zone 510 and the perimeter wall 310.

The second intermediate zone 518 can be an annular area disposed immediately concentrically about the first intermediate zone 514. The second intermediate zone 518 can have an outer diameter that corresponds with the radially outermost edge of one or more of the sets of vanes 414, 416, 418, 420, 422, 424, 426. In the example provided, the diameter of the second intermediate zone 518 generally corresponds to the radially outermost edges of the fourth vanes 416 and the sixth vanes 420. In the example provided, the second intermediate zone 518 can generally correspond to halfway between the center zone 510 and the corners of the air chamber 318 (i.e. where the lateral sides 330 meet the longitudinal sides 326). The outer zone 522 can generally be the area of the air chamber 318 that is radially outward of the second intermediate zone 518. The distance between adjacent vanes 322 in the outer zone 522 can be greater than the distance between adjacent vanes 322 in the second intermediate zone 518. The distance between adjacent vanes 322 in the second intermediate zone 518 can be greater than the distance between adjacent vanes 322 in the first intermediate zone 514, but lesser than the distance between adjacent vanes 322 in the outer zone 522. Thus, the vanes 322 can define discrete funnels or channels 526 that widen proximate to the outer perimeter 234 and narrow proximate to the aperture 342.

In operation, as the center zone 510 builds up debris, air flowing through the filter element 238 into the air chamber 318 can encounter slightly greater resistance to flow through the filter element 238 due to the relative distances between the adjacent vanes 322 in the respective zones 514, 518, 522. The closer the proximity of adjacent vanes 322, the higher the resistance and pressure opposing air flow through the filter element 238 at the respective zone 514, 518, 522. Thus, the resistance or pressure opposing flow through the filter element 238 at the second intermediate zone 518 can be lower than at the first intermediate zone 514 and higher than at the outer zone 522. In other words, the pressure opposing flow through the filter element 238 can decrease with increased radial distance from the center zone 510 due to the relative proximity of the adjacent vanes 322. Additionally, due to the funnel shape of the vanes 322, the velocity of the air flowing radially inward between the vanes 322 increases with decreased radial distance from the aperture 342.

Thus, as the center zone 510 becomes blocked with debris, a greater amount of air can be drawn through the relatively low pressure areas of the outer zone 522 and second intermediate zone 518 than would normally occur in conventional systems. The decreasing pressure gradient from the first intermediate zone 514 to the outer zone 522 causes air to be drawn more evenly across the entire surface area of the filter element 238 than would occur in conventional systems. Thus the vanes 322 inhibit the pattern of concentrically expanding debris buildup caused by conventional systems. Instead, debris can build up more evenly across the filter element 238.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). The term "and/or" includes any and all combinations of one or more of the associated listed items.

Although the terms first, second, third, etc. may be used to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements describe as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used interpreted accordingly.

What is claimed is:

1. A housing for a panel filter, the housing comprising:
a main body defining a chamber and a central aperture, the central aperture extending through the main body and in fluid communication with the chamber;
a plurality of first vanes disposed within the chamber and circumferentially spaced about the central aperture, each first vane extending radially outward from the central aperture a first distance; and
a plurality of second vanes disposed within the chamber and circumferentially spaced about the central aperture, each second vane extending radially outward from the central aperture a second distance that is less than the first distance.

2. The housing of claim 1, wherein the first and second vanes are planar and aligned with a center of the central aperture.

3. The housing of claim 1, wherein the first vanes extend radially outward from the central aperture to contact a perimeter wall of the chamber, and the second vanes do not extend to the perimeter wall.

4. The housing of claim 3, further comprising a plurality of third vanes disposed within the chamber and circumferentially spaced about the central aperture, the third vanes do not extend to the perimeter wall, and each third vane extends radially outward from the central aperture a third distance that is less than the second distance.

5. The housing of claim 1, wherein the chamber is a generally rectangular or square shape and the central aperture is a round shape.

6. The housing of claim 1, wherein a distance between adjacent ones of the first and second vanes increases with radial distance from the aperture.

7. The housing of claim 1, further comprising a plurality of third vanes disposed within the chamber and circumferentially spaced about the central aperture, each third vane extending radially outward from the central aperture, wherein an outermost end of each second vane is spaced apart from a peripheral wall of the chamber, and an outermost end of each third vane is spaced apart from the peripheral wall a greater extent than the outermost ends of the second vanes.

* * * * *